US012244256B2

(12) United States Patent
Dallas et al.

(10) Patent No.: US 12,244,256 B2
(45) Date of Patent: Mar. 4, 2025

(54) NOISE LIMITED POWER TOOLS AND EQUIPMENT

(71) Applicant: Oregon Tool, Inc., Portland, OR (US)

(72) Inventors: Edgar A. Dallas, Beaverton, OR (US); Erik Jensen, Portland, OR (US); Shaun Conley, Portland, OR (US); Jonathan Ziring, Portland, OR (US)

(73) Assignee: Oregon Tool, Inc., Portland, OR (US)

( * ) Notice: Subject to any disclaimer, the term of this patent is extended or adjusted under 35 U.S.C. 154(b) by 140 days.

(21) Appl. No.: 18/135,532

(22) Filed: Apr. 17, 2023

(65) Prior Publication Data

US 2023/0275535 A1 Aug. 31, 2023

Related U.S. Application Data

(63) Continuation-in-part of application No. 16/610,874, filed as application No. PCT/US2018/030743 on May 2, 2018, now Pat. No. 11,632,066.

(60) Provisional application No. 62/500,952, filed on May 3, 2017.

(51) Int. Cl.
*H02P 27/08* (2006.01)
*A01D 34/00* (2006.01)
*A01D 69/02* (2006.01)
*H02K 7/14* (2006.01)

(52) U.S. Cl.
CPC .......... *H02P 27/085* (2013.01); *A01D 34/006* (2013.01); *A01D 69/02* (2013.01); *H02K 7/14* (2013.01)

(58) Field of Classification Search
CPC ..... H02P 27/085; A01D 34/006; A01D 69/02; A01D 34/78; H02K 7/14
USPC ........................................ 318/17, 3
See application file for complete search history.

(56) References Cited

U.S. PATENT DOCUMENTS

| | | | |
|---|---|---|---|
| 5,835,676 A | 11/1998 | Komatsu et al. | |
| 5,838,877 A | 11/1998 | Elliot et al. | |
| 6,426,602 B1 * | 7/2002 | McCann | B62D 5/046 318/284 |
| 7,112,933 B1 | 9/2006 | Ueda et al. | |
| 7,382,104 B2 * | 6/2008 | Jacobson | A01D 34/902 30/296.1 |
| 7,701,159 B2 | 4/2010 | Chida et al. | |
| 7,923,961 B2 * | 4/2011 | Takamatsu | H02P 27/08 318/599 |
| 8,179,060 B2 * | 5/2012 | Wende | H02P 31/00 318/727 |
| 9,438,160 B2 * | 9/2016 | Yamada | H02P 5/74 |
| 9,948,224 B1 | 4/2018 | Huh et al. | |
| 10,856,928 B2 * | 12/2020 | Shelton, IV | A61B 18/1206 |
| 2004/0232864 A1 | 11/2004 | Sunaga et al. | |
| 2005/0007042 A1 | 1/2005 | Moore et al. | |
| 2010/0090775 A1 | 4/2010 | Huda et al. | |
| 2010/0201299 A1 | 8/2010 | Emde et al. | |

* cited by examiner

*Primary Examiner* — David Luo
(74) *Attorney, Agent, or Firm* — Foley & Lardner LLP

(57) ABSTRACT

A method includes operating an electric implement to move or cut material in an outdoor environment, wherein operating the electric implement creates acoustic sound and managing the acoustic sound by selecting an operating frequency for the electric implement and controlling an electric motor of the electric implement in accordance with the operating frequency.

21 Claims, 8 Drawing Sheets

NOISE LIMITED POWER TOOLS AND EQUIPMENT

RELATED APPLICATIONS

This application is a continuation-in-part of U.S. application Ser. No. 16/610,874, which is a national phase application of PCT Application No. PCT/US2018/030743, filed May 2, 2018, which claims priority to U.S. Provisional Patent Application No. 62/500,952, filed on May 3, 2017, all of which are incorporated by this reference herein.

TECHNICAL FIELD

Embodiments herein relate to the field of electric tools, and, more specifically electric tools with low noise output.

BACKGROUND

Electric power tools, such as leaf blowers, hedge trimmers, string trimmers, edgers, and similar such landscape maintenance implements and construction equipment typically include an electric motor of some sort. Electric motor powered tools can offer advantages over their gas powered counterparts, including silence while not actively engaged, lack of a requirement to store and/or mix fuel, lack of exhaust fumes, and overall lessened maintenance. Electric power tools further may offer cost savings over their lifetime, as the electricity for running a tool or charging a battery pack for a cordless tool typically costs less than purchasing fuel. Even while running, electric power tools are typically quieter than their gas powered counterparts, as the bulk of any generated noise comes from the operating components of the tool, rather than the motor itself.

With the availability of high energy density lithium chemistry battery packs, electric power tools can be made cordless without sacrificing power or gaining substantial weight. As a result, lithium-ion powered cordless tools can offer power levels comparable to, or even exceeding, those of traditional gas-powered equipment and implements.

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION

Figure 1:
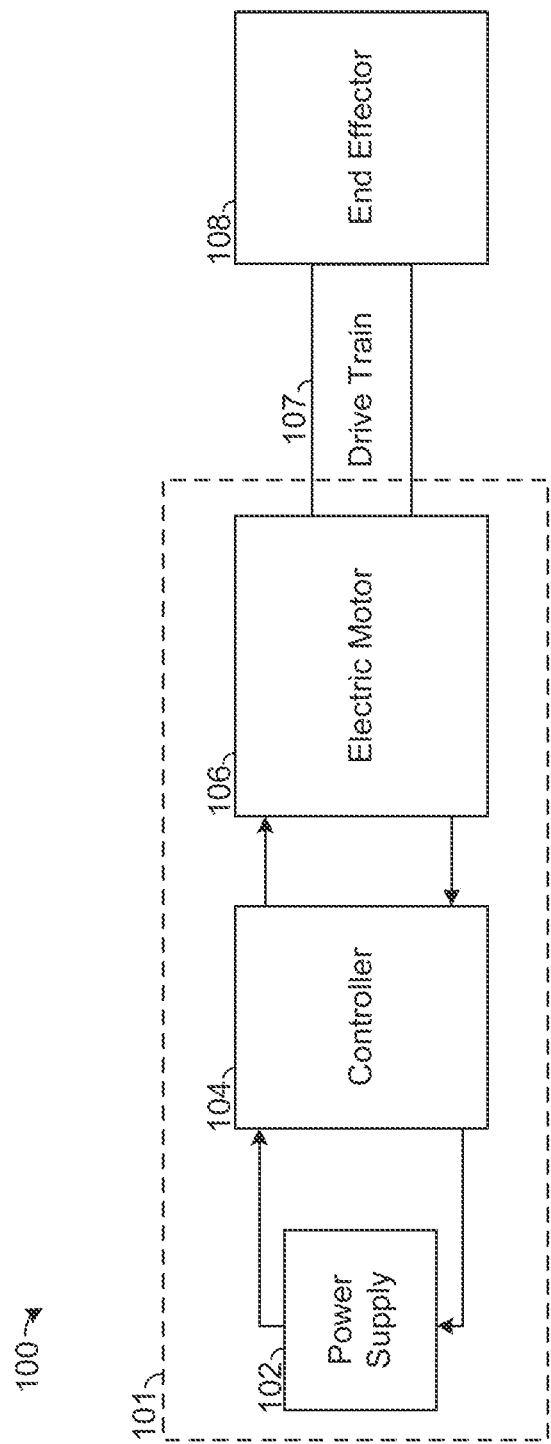
FIG. 1 shows a block diagram of the components of an electric powered tool, according to various embodiments.

Even though electric power tools (including equipment, implements, etc.) can be quieter than their gas-powered counterparts, these tools may still generate enough noise in operation to cause an environmental impact. Noise sources may include the operative components of the tools, such as blower fan noise, gear and string noise from a string trimmer, gear and bar noise from a hedge trimmer or a chain saw, a blade of a mower (e.g., rotary cutter), a blade of a saw (e.g. flat saw), and other similar sources. This noise may be sufficient to disturb neighbors, disrupt sleep and interfere with normal daily activities. Moreover, loud noises are typically undesirable for operators of tools. In some instances, local governmental agencies have placed restrictions on the use of tools that generate sound levels deemed to be at a public nuisance level.

The noise profile of an electric power tool (e.g., including electric equipment, electric implements, etc.) typically depends upon its operating parameters. Electric power tools may achieve high power levels by spinning the motor at a high revolutions per minute (RPM) level as compared to a comparable gas-powered tool. This may translate to high operating speeds for the tool's operative components, further increasing the tool's noise level. In some cases, the operative components of an electric power tool may generate greater noise than comparable components of a gas-powered counterpart due to the higher motor operating speeds needed to achieve comparable power. For example, spinning the motor at a relatively high RPM level may necessitate a gear reduction from the motor for driving the operative components at a suitable speed, and therefore translating the motor's high rotational speed into greater torque. Gear drives, besides imposing a power loss due to heat and additional friction, also increase tool noise, depending upon the gear box configuration.

In the case of cordless tools, these high operating speeds may be necessitated by the limitations of battery pack technology. A battery pack is limited in the amount of current it can provide to a load at a given voltage. As power is a function of voltage multiplied by current, a lower voltage requires a greater current to achieve a given power level. As a general principle, increasing current through a conductor results in an increase in generated heat due to conductor resistance. Dissipation of heat buildup is often aided by using a motor-mounted fan to force air through the motor windings. This may result in high RPM motors being preferable, or even required, over lower RPM motors. Comparatively low RPM motors may be unable to effectively dissipate the heat generated at the voltage levels offered by existing battery systems without an undesirable reduction in available power.

Despite their noise, fumes and often increased weight, gas powered tools still find favor, especially with commercial users who may demand high power levels to efficiently complete jobs. At present, many electric tools are engineered for home users, and so may not be able to deliver commercial level performance.

Disclosed herein are electric power tools (e.g., landscaping implements, construction equipment, tractor attachments, etc., including leaf blowers, string trimmers, chain saws, edgers, rotary cutters, finish mowers, rotary tillers, snow blowers, seeders, post hole diggers, flail shredders, stump grinders, power cutters, flat saws, etc.) that achieve a high power level at a comparably low operating speed and comparably lower motor RPM levels. As a result, the disclosed electric power tools may deliver power that equals or exceeds gas-powered counterparts, to a level comparable to commercial-grade tools, while providing noise levels lower than both comparable gas-powered tools and electric power tools powered in a conventional, high-RPM configuration.

In the following detailed description, reference is made to the accompanying Figures, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments.

Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Referring to FIG. 1, an electric tool 100 is shown, according to some embodiments. The electric tool 100 can be an alternating current (AC) or direct current (DC) operated tool (equipment, implement) such as a leaf blower, stick trimmer, hedge trimmer, chain saw, edger, rotary cutter, finish mower, snow blower, tractor attachment, post hole digger, flail shredder, rotary tiller, stump grinder, power cutter, flat saw, etc., for example a tool for landscaping or construction (e.g., gardening, lawn care, agriculture, building, renovating, etc.). The electrical tool 100 is shown as including circuitry 101 which includes a power supply 102, a controller 104 coupled to the power supply 102 to receive power from the power supply 102, and an electric motor 106 coupled to the controller 104 such that the controller 104 is able to control the electric motor 106 and provide power form the power supply 102 to the electric motor 106.

The electric tool 100 is further shown as including an end effector 108. The end effector 108 is a fan blade, string trimmer head, hedge trimmer bar, saw chain, cutter blade, auger, saw blade, or similar implement, in various embodiments. The electric tool 100 is also shown as including a drive train 107 coupled to the end effector 108 and the electric motor 106, such that the end effector 108 can be driven by the electric motor 106 via the drive train 107. The electric motor 106 is operable to supply mechanical power to the end effector 108 via a drive train 107. In some embodiments, the drive train 107 converts the rotational motion from the electric motor 106 to a type of motion suitable for the end effector 108 (e.g., from rotary to reciprocating motion, from rotary motion at a first frequency to a rotary motion at a second frequency, etc.).

In some embodiments, the power supply 102 includes a power cord configured to be connected to an external electrical supply. In some embodiments, the power supply 102 includes a self-contained power pack (e.g., battery pack). Where power supply 102 includes a power cord, the power supply 102 may be configured to plug into an electrical supply such as an electrical system of a building or facility (e.g., drawing electricity from an electrical grid), a portable power pack, or a battery pack. The power supply 102 may include power electronics configured to use such external power to make a suitable voltage and current available to the controller 104 and the electric motor 106. In some embodiments, this voltage may be at least 90 VDC. The acceptable supply voltage may vary depending upon both the typical use environment for the tool 100, as well as the nature of the tool 100 itself.

In some embodiments, the power supply 102 may include a self-contained power pack that engages directly into tool 100, such as a battery pack. The power supply 102 may be configured to provide a nominal voltage at or greater than at least 90 volts DC (VDC) or greater than 100 volts DC (VDC). Where power supply 102 is a battery pack, the battery pack may include one or more power cells, such as lithium-ion (Li-ion) cells, arranged in parallel and/or series combinations to achieve a desired voltage, current, and capacity. For example, for a tool 100 configured to accept 100 VDC, power supply 102 may have 30 Li-ion cells wired in a series configuration (30-S), each with a nominal cell voltage of approximately 3.6 VDC. When wired in series, the cells' voltages are additive while retaining a current capacity equivalent to the average of all cells, resulting in a total nominal voltage of 3.6 VDC*30=108 VDC. Such a pack may have an operating voltage range from 100-126 VDC at full charge with no load (each cell has a full charge voltage of 4.2 VDC), to approximately 90 VDC approaching full discharge when under load (each cell may be drained down to an at-load voltage of approximately 3 VDC without damage or unacceptably shortening cell life). These figures may vary from embodiment to embodiment depending upon the selected type and chemistry of power supply 102's constituent cells.

Power supply 102, in battery pack embodiments, may also be configured with one or more cells wired in a parallel configuration, where the overall current capacity is additive, but voltage is averaged across all cells, so as to achieve a battery pack that has increased current delivery. If, for example, two Li-ion cells each capable of delivering a sustained current of 5 Amps at a nominal 3.6 VDC are wired in series, the resulting pack would deliver 7.2 VDC (3.6 VDC*2) at a sustained current of 5 Amps. Wiring the cells in parallel would result in a battery pack capable of delivering a sustained current of 10 Amps (5 Amps*2), but at the nominal cell voltage of 3.6 VDC. Battery packs may further be configured to use a combination of series and parallel configurations to enhance both voltage and current delivery levels. For example, if the 30-S battery cell configuration described above is doubled in a parallel configuration (two 30-S sets of series-wired cells wired in parallel), the resulting 60 cell battery pack may supply the same voltage level of the 30-S pack, 108 VDC nominal (3.6 VDC*30), but with twice the current delivery (if each cell can sustain 5 Amps, then the overall pack could deliver 10 Amps continuous at 108 VDC nominal). Such a pack may be designated as a 30-S 2-P configuration, indicating two sets of 30 cells wired in series, the two sets being wired in parallel. Other configurations of S- and P- may be implemented to achieve a battery pack with desired nominal voltage and current delivery characteristics suitable to an intended application. It should further be understood that other considerations, such as the overall weight and bulk of tool 100 when power supply 102 is installed or connected, may factor into a chosen battery pack configuration.

As discussed above, power supply 102 provides power into controller 104 as well as for electric motor 106, for example with the controller 104 configured to control and modulate the flow of power from power supply 102 to electric motor 106. In some embodiments, the controller 104 is configured to enable a user of tool 100 to selectively actuate tool 100, as well as moderate the power being delivered to end effector 108, and thus the total power provided by tool 100 for a given job. The controller 104 may be implemented as one or more electronic controllers, such as a microprocessor, a microcontroller, discrete circuitry such as transistor-transistor logic (TTL), and/or power regulating components such as suitable resistors, capacitors, and/or inductors, a combination of the foregoing, or some other device offering similar functionality. Some embodiments may implement some or all of controller 104 using a field-programmable gate array (FPGA), application-specific integrated circuit (ASIC), or another similar technology. In some embodiments, controller 104 may include a computer-readable medium such as a memory storage unit containing instructions capable of being executed by a processing unit that is part of controller 104, causing the processing unit to perform the operations attributed herein to the controller 104. For example, instructions stored in such computer-readable medium and executed by a processing unit may cause the controller 104 to provide power to electric motor 106 in an optimal way so as to maximize power available to end effector 108 while minimizing the noise profile of tool 100.

Controller 104 may include, at least in part, circuitry for controlling the power to electric motor 106. The specifics of this circuitry may depend upon the nature of electric motor 106, and may be considered to be partially or wholly an electronic speed controller (ESC). The ESC of controller 104 may modulate flow of current to (and thus the power delivered by) electric motor 106 using any technique suitable to electric motor 106. For example, the ESC may employ pulse-width modulation (PWM) to provide a desired voltage and current to electric motor 106. Controller 104 may use power switching devices such as MOSFETs or IGBTs, controlled by a portion of controller 104, to effect switching of the power supply 102 to electric motor 106 to achieve a desired power level, as may be commanded by a user of tool 100.

The controller 104 can provide PWM, i.e., a switching technique where the full current and voltage provided by power supply 102 is delivered in regular controlled pulses (bursts of "on") interspersed with power being shut off from power supply 102. The intervals between the pulses are defined as a PWM frequency or carrier frequency. If the time duration between the start of a pulse (switching on) and the start of a subsequent pulse is sufficiently short, the effective voltage and current, and resultant power, seen by electric motor 106 becomes the average between the voltage of a pulse and its corresponding off time. The effective voltage seen by the electric motor 106 may be expressed by an equation such as $V_{eff}=V_{supp}*(t_{pulse}/t_{freq})$, where $V_{eff}$ is the effective voltage, $V_{supp}$ is the voltage provided by power supply 102, $t_{pulse}$ is the time duration of the on pulse, and $t_{freq}$ is the time width of an on-off cycle (the carrier frequency). For example, if power supply 102 supplies a nominal voltage of 108 VDC, a duty cycle of 50% over a given time period at a PWM frequency of 10 kHz can result in an effective voltage of 54 VDC, as such: 108*(0.00005/0.0001). At 10 kHz carrier frequency, the pulse interval duration is 0.0001 second; with a duty cycle of 50%, each pulse takes up half the pulse interval duration, resulting in a pulse lasting 0.00005 second. In another example, a duty cycle of 75% would result in 108*(0.000075/0.0001)=81 VDC. It may be recognized that multiplying the voltage by the duty cycle percentage will yield the same results, regardless of carrier frequency.

Controllers implementing PWM for power control typically employ a carrier frequency below 7 kHz, which is within the typical audible range of most users, and may be perceived as a high-pitched whistle, which may be especially noticeable as tool 100 is operated at lower powers. This high-pitched whistle can contribute to the overall noise profile of tool 100.

The controller 104 is configured to use a PWM carrier frequency at or above 7 kHz, which can effectively reduce or even push the whistle beyond the audible range of most users, thereby lowering the noise profile of tool 100. As the carrier frequency is increased above 7 kHz, the noise profile of tool 100 may continue to improve. However, switching losses due to PWM may also start increasing, depending upon the configuration of controller 104 and electric motor 106. These losses may result in unacceptably high power losses, and may further result in generation of unwanted spurious RF frequencies. In experimental testing supporting the present disclosure, configuration of the controller 104 to use a PWM carrier frequency of 10 kHz was found to yield good power suitable for the landscaping, agricultural, construction, etc. tools, equipment, implements, tractor attachments, etc. herein, with acceptable switching losses, and at a frequency that a majority of users either cannot perceive or do not notice as irritating. Accordingly, the controller 104 is configured to provide power to the electrical motor 106 using a PWM carrier frequency of approximately 10 kHz (e.g., in a range from 9 kHz-11 kHz). Other (e.g., higher) PWM carrier frequencies can be used in other embodiments, for example, a PWM carrier frequency of up to 20 kHz can be used by the controller 104 in some embodiments. In experimentally tested embodiments, use of a PWM carrier frequency of 20 kHz by the controller 104, while resulting in good audio characteristics, resulted in switching losses which were substantial but could be mitigated by varying the configuration of controller 104 and electric motor 106 to compensate for such losses. The choice of carrier frequency may ultimately be influenced by the electrical characteristics of electric motor 106, e.g. impedance/inductance, as well as by possible RF emissions requirements, as higher carrier frequencies may result in spurious RF emissions being generated.

Controller 104 may also employ various drive methodologies for electric motor 106. For example, some embodiments of controller 104 may use a sinusoidal wave field-oriented control (FOC) to drive electric motor 106 (e.g., where electric motor 106 is a brushless type), which may provide a greater efficiency over traditional triangle-wave drive methods. Moreover, depending upon the configuration of electric motor 106, a sinusoidal wave FOC may further reduce noise from tool 100 by reducing side effects found in traditional motor commutation techniques. These side effects may include torque ripple, which can generate spurious vibrations and, depending upon the nature of the vibrations, contribute to the noise profile of tool 100. By employing sinusoidal wave FOC, the noise profile of tool 100 can be further reduced in various embodiments.

Electric motor 106 may be any suitable motor that is capable of being driven by a properly configured controller 104. In some embodiments, electric motor 106 may be a self-commutating brushed motor, where controller 104 need only supply a proper voltage and current to electric motor 106, with the speed and/or power delivered by electric motor 106 determined by the voltage and available current. In other embodiments, electric motor 106 may be of a brushless type, such as a three-phase externally commutated motor (also known as a brushless DC motor), where switching between motor phase windings is handled electronically by controller 104, and, in particular, ESC circuitry of controller 104. In further embodiments, electric motor 106 may be of an outrunner type, where the stator pole windings are held fixed in the core of electric motor 106, while the motor can (typically outfitted with a plurality of permanent magnets) spins to provide the motor's motive force. Brushless DC outrunner motors may spin at lower RPMs while still producing relatively high torque as compared to more traditional in-runner configurations, where the stator pole windings are disposed on the outside of the motor can, with the spinning rotor including the core of the motor. Outrunner motors typically have a differing number of magnetic poles in the rotating can than stator pole windings, to ease motor starting and prevent cogging, which in turn results in a smoother running and more efficient motor.

Figure 2:
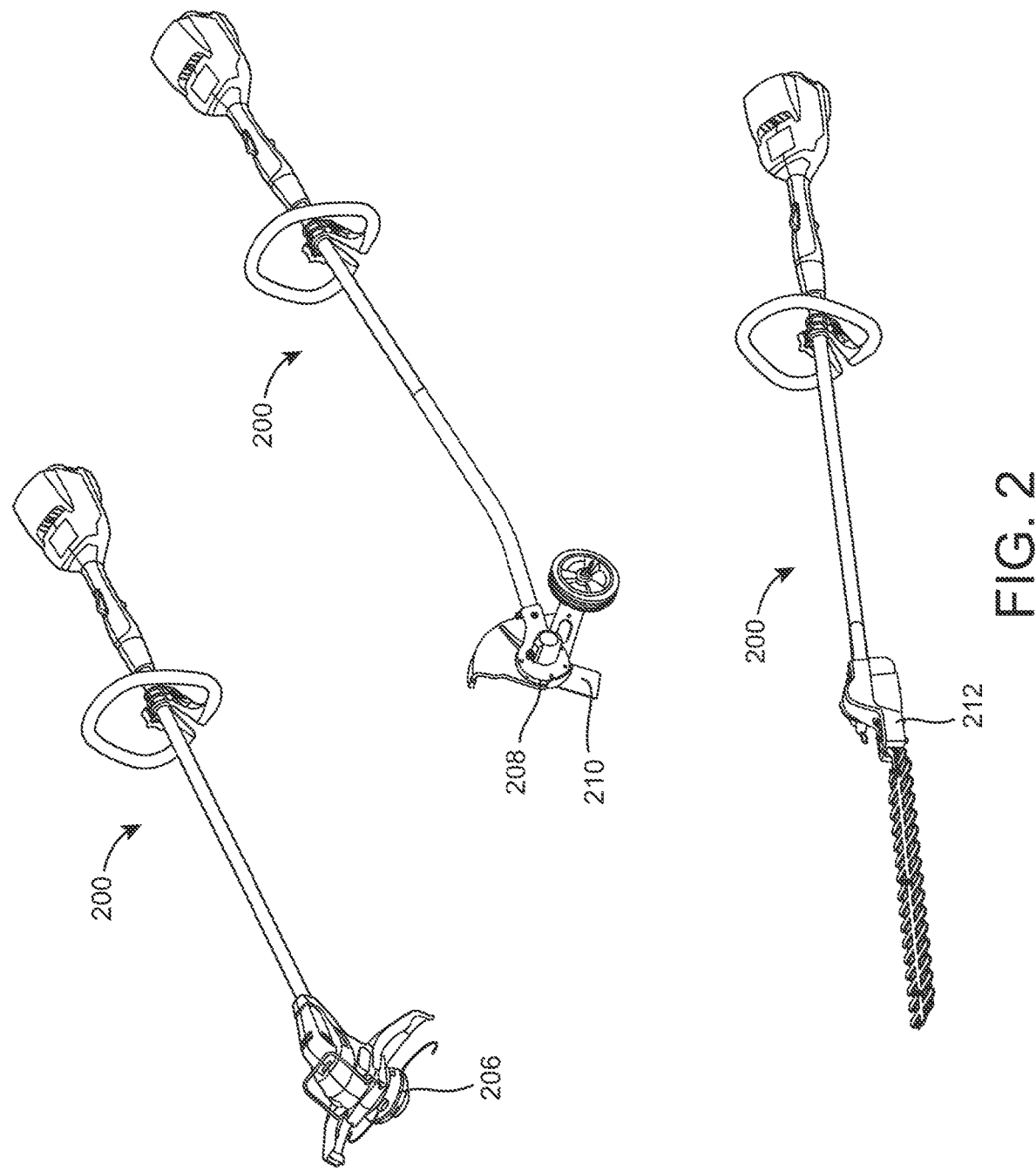
FIG. 2 is an illustration of several stick tools, according to some embodiments.

In some embodiments, electric motor 106 may be a brushless DC motor, as described above. In some embodiments, electric motor 106 has a nine stator pole, 6 magnetic pole outrunner configuration. The stator may be wound in a delta configuration, and the number of turns may depend upon the particular application for which electric motor 106 is employed. For example, stick type tools such as string trimmers, hedge trimmers, and edgers (as seen in FIG. 2) may employ an electric motor 106 that has stator poles with 31-turn windings. Tools such as blowers, which may require a somewhat higher RPM, may employ 38-turn stator windings. In some examples, electric motor 106 may utilize stator poles with between 30 to 40 windings, with copper wire configured for motor windings or another high temperature use, such as magnet wire. The selected wire may be between 0.50 mm to 0.70 mm in diameter. In particular, where tool 100 is a blower, the wire may be approximately 0.60 mm in diameter. Where tool 100 is a stick tool such as a string trimmer, edger, hedge trimmer, or other such tool, the wire may be approximately 0.64 mm in diameter. Other tool embodiments, such as a rotary cutter, snow blower, tractor attachment, power cutter, flat saw, or other such tool, may vary these parameters as needed to achieve a high-power low-noise operation. Thus, the number of stator poles, magnetic poles, and stator pole windings can vary to provide a high-power but low-speed motor suitable to the application of a given tool 100.

In embodiments, the electric motor 106 may provide a particular power density, yielding a tool 100 that is powerful, while lighter and quieter than electric motors commonly used in currently known battery powered power tools. Power density (or volume power density or volume specific power) as used here is the amount of power (time rate of energy transfer) generated per unit mass of the electric motor 106. The more powerful and (or) the smaller/lighter the electric motor 106, the higher the power density of the electric motor 106. In some embodiments, the electric motor 106 is a high power density motor used in a tool 100 having a mechanical output power of about 1000 watts to about 2000 watts, such as 1600 watts, and have a mass of about 1000 grams to about 1200 grams, such as about 1100 grams, yielding a power density of about 1.4 watts per gram for the electric motor 106. In various embodiments, a high power density electric motor 106 has a power density of greater than about 1.2 watts per gram, greater than about 1.3 watts per gram, greater than about 1.4 watts per gram, greater than about 1.5 watts per gram, or even greater than about 1.6 watts per gram. In comparison, electric motors typical of current tools range from 0.5 to 1.0 watt/gram.

Embodiments of electric tool 100 have a power range from 1000 watts and above, for example up to 1600 watts, 2000 watts, or higher. Typical power range of electric motors for tools, such as an electric leaf blower motor, is 250 to 1200 watts, such that the electric tool 100 is more powerful than typical electric leaf blowers or other electric tools. In embodiments, the disclosed electric tool has a nominal voltage range from about 90 volts to higher voltages, for example to about 108 volts, 120 volts, 130 volts, 700 volts or higher, whereas typical electric tools have lower or different nominal voltage ranges. In an embodiment, a power source may be configured to provide a nominal voltage of at least 100 volts direct current (VDC).

In an embodiment, a tool 100 has an electric motor configured to provide substantially identical power to an electric motor in a tool that is powered by a power source that provides less than 100 volts.

Electric motor 106 is coupled to the end effector 108 via a drive train 107. Drive train 107 may, in some embodiments, be as simple as a direct transmission shaft that powers the end effector 108 at a 1:1 ratio with each turn of electric motor 106. In such embodiments, the end effector 108 operates at a speed equivalent to electric motor 106. In some embodiments, the electric motor 106 may directly drive the end effector 108, where drive train 107 is omitted in favor of attaching end effector 108 directly to the output shaft of electric motor 106. In other embodiments, drive train 107 includes a gear drive or gear box, such as where the end effector 108 reciprocates during operation (rather than rotating). For example, where tool 100 is a hedge trimmer, the cutting bar may rely upon a reciprocating motion, and so drive train 107 includes an eccentric cam or crankshaft configuration to convert the rotational motion of electric motor 106 into a reciprocating motion to drive the cutting bar. Still other types of end effectors 108 may require a slow RPM speed below what electric motor 106 can feasibly deliver. A drive train 107 for such an application may be designed with low-friction materials as well as a helical or hypoid gear configuration to minimize any gear train noise, and thereby reduce the noise profile of tool 100.

End effector 108 may be any implement designed to carry out the intended tasks of tool 100, e.g. a string reel for a string trimmer, a cutting bar for a hedge trimmer, a rotating blade for an edger, a drive sprocket and saw chain for a chain saw, a fan or turbine disc to direct air through a plenum for a blower, a mower blade, a rotary cutter blade, a flail knife, a grinding wheel, an auger, a saw blade, etc. It should be understood that these are merely examples; other types of tools may require end effectors 108 appropriate to their designed tasks. Each end effector 108 may further be refined in ways specific to the nature of end effector 108 to reduce the noise profile of tool 100. For example, where tool 100 is a string trimmer, end effector 108 may be directly attached to electric motor 106, which is configured to run at an appropriate head speed for end effector 108. Where electric motor 106 is configured to provide a high torque level at an RPM equal or lower to a conventional string trimmer, end effector 108 may be able to be spun at a lower RPM without sacrificing power, resulting in a lower noise tool 100 that still delivers relatively high power. End effector 108, in the case of a string trimmer, may further be equipped with aerodynamically enhanced or designed line so as to minimize power draw. The lower head speed enabled by a high-power low-RPM electric motor 106 may reduce the noise profile of tool 100 by avoiding the tip of the string from traveling at or near supersonic speeds.

Similar such gains can be realized from operating the end effectors 108 of the various embodiments of tool 100 described above at lower speeds, but with a motor delivering comparably higher torque so that power is maintained.

Other improvements in the noise profile of tool 100 may be realized depending upon the nature of tool 100. For example a tool 100 that is a blower may use a more aggressively designed fan or turbine that is configured to move a higher volume of air at a lower RPM, e.g. by increasing its diameter, number of blades, blade pitch, etc. A fan may be aggressively designed to move a large volume of air at a lower RPM at the expense of requiring greater torque output from the motor. Such a fan may thus be optimized to the running parameters of electric motor 106, which may be configured to provide greater torque at a lower RPM. For example, a blower according to various embodiments may include an electric motor 106 configured to turn at a maximum of 5500 RPM, with the fan being directly driven by electric motor 106. Further reductions in fan speed (and associated noise) may be possible, with consideration given to the overall weight and size of the combination of fan and electric motor 106. Specifically, operator comfort and usability of tool 100 may become limiting factors that hinder further noise reductions, rather than technical limitations.

Where tool 100 is a blower, the blower may be capable of outputting air at a force of at least 20 N (Newtons). In some specific examples, a blower tool 100 may output air at a force at or above 22 N. This force captures both aspects of a blower output—air velocity, and air volume. Air velocity may be increased by adding a comparatively smaller nozzle to the end of the output plenum, which can raise the pressure and velocity by reducing the air volume. Conversely, a larger nozzle may increase the volume of air used, but at a decreased pressure, and hence velocity. High air velocity without a high corresponding air volume can yield a blower that is capable of "pushing" debris easily, but only in a limited area; this may increase the time it takes to complete a job. High air volume without a corresponding high velocity may yield a blower that does not have significant pushing power, which may limit the types of jobs that can be handled to only very light debris. Tool 100 may offer both high velocity and high volume, while maintaining a low noise profile.

As disclosed above, tool 100 has been advantageously designed via the foregoing elements of power supply 102, controller 104, electric motor 106, drive train 107, and end effector 108 to operate at high power while producing noise far below the expected level. In embodiments, a disclosed electric tool 100 emits sound at less than 75 decibels (dB), such as less than 70, less than 65, less than 64, less than 60, less than 60, or even less than 59 decibels, such as between 59 and 75 decibels or between 50 and 70 decibels or between 10 and 50 decibels, as experienced by a bystander at 50 feet from the tool 100 (or as measured by a decibel meter or other tool at the same distance) without obstructions (structures, walls, buildings, soil, foliage, etc.) between the bystander and the tool 100.

As will be understood from the foregoing, in various embodiments, the electric motor 106 is designed to run at a lower rotational speed than a typical tool motor without sacrificing power output. The reduction in working speed translates to less noise being emitted from the motor 106 and from end effector 108. In some embodiments, such as where tool 100 is a blower, the noise reduction may be realized both from the working end of the tool (e.g. the blower output plenum) and the intake end of the tool. Additionally, structural born noise is reduced. In embodiments, the disclosed electric tool 100 at full power operates between about 5000 RPM to 8000 RPM (e.g., as a result of control of the electric motor 106 by the controller 104), such as 5800 RPM. In some embodiments, the disclosed electric tool 100 operates between 540 to 1000 RPMs as can be suitable for a tractor attachment. In some embodiments, the motor 106 operates at a lower RPM to directly drive an end effector of a tractor attachment without gear boxes to increase or decrease the RPM, for example at an RPM less than 600, less than 300, etc. By comparison a typical combustion motor at full power operates at 6500 to 7500 RPM. A typical DC motor, such as of an in-runner configuration, operates at 8000 RPM to 30,000 RPM, sometimes in conjunction with gear reduction.

As will be appreciated from the foregoing, in various embodiments, the electric motor 106 used in the tools disclosed herein are further designed for low RPM by using high temperature winding wire material and high temperature high power magnets, such as neodymium magnets. In embodiments, using a 108 VDC nominal power supply 102 results in a smaller electric current running through the motor for a given power level, and less power loss. Because power is a product of voltage and current, a higher voltage requires less current to achieve a given power level. As discussed above, higher currents typically result in increased heat through a given conductor, such as a motor winding. Typical power tool motors are 18 VDC to 86 VDC and need to exceed 8,000 RPMs in order to achieve a high enough RPM to properly cool the high power motor. By using a higher voltage, the current required to achieve a comparable power level in tools 100 in the disclosed embodiments is reduced, which may result in an electric motor 106 that does not generate heat as quickly as conventional tools that use lower voltage power supplies. In addition, by running the motor at a lower RPM, bearing noise, electrical harmonics, and motor fan noise may be reduced.

In some embodiments, the circuitry 101 also includes an input device (e.g., button, knob, switch, touchscreen display, microphone, etc.) conductively coupled to the controller 104 so as to provide an indication to the controller 104 of a user input to the input device. In some such embodiments, the controller 104 is configured to change, in response to the user input, the acoustic sound produced by the tool 100 by changing operation of the electric motor 106. For example, the controller 104 may increase the loudness of the electric motor 106 and/or change a timbre of the sound emitted by the electric motor 106 in response to the user input, for example by increasing an RPM and/or changing a carrier frequency of pulse-width modulation of the electric motor 106 into an audible range (e.g., below 7 kHz), for example such that the tool 100 sounds like it is working harder in response to the user input. As another example, the controller 104 may decrease the loudness of the tool 100 in response to the user input, for example by reducing an RPM of the electric motor 106 in response to the user input. Accordingly, a user of the tool is enabled to change the sound produced by the tool 100 by providing a user input to an input device, which may be desirable for the user based on the user's location (e.g., near or far from a building or other person or animal) or other consideration relevant to the user.

FIG. 2 shows embodiments of electric tool 100 where the electric tool 100 is a stick tool, in particular a string trimmer 200, an edger 202, or a hedge trimmer 204 as shown in FIG. 2 according to some embodiments. In a stick tool example, such as but not limited to the string trimmer 200, the edger 202, and the hedge trimmer 204 shown in FIG. 2, the drive train 107 rotates at a lower RPM because of the relatively low speed electric motor 106 disclosed herein (as compared to conventional stick tools). This results in less shaft noise due to lower friction and vibration as compared to conventional stick tools. The drive train 107 (e.g., a low RPM drive shaft) may also result in a low RPM gear box (below 6000 RPM), if a gear box is used (e.g. in the case of a hedge trimmer, tractor attachment, rotary cutter, flat saw, etc.). Where a gear box is included, lower at the electric motor 106 provides for less gear reduction of RPM and hence less gear box noise due to gear friction, bearings and vibration. With respect to a string trimmer head 206 of the string trimmer 200, this lower RPM results in a significantly quieter string trimmer head 206. As discussed above, electric motor 106 may effectively directly drive the string trimmer head 206, either via a simple shaft as drive train 107, or via direct attachment. Direct attachment may be accomplished by locating the electric motor 106 proximate to (e.g., in) the string trimmer head 206, and directly attaching a rotating portion of the string trimmer head 206 to electric motor 106, thereby omitting drive train 107. A higher RPM in a conventional trimmer means the string tip is traveling at a higher velocity as noise increases roughly equal to the square of the string tip velocity. As disclosed, using lower RPMs results in a reduction of noise due to string tip velocity. In some embodiments, the edger 202 is likewise configured with the electric motor 106 located in an edger head 208 of the edger 202, for example such that the electric motor 106 directly drives a blade 210 of the edger 202. In some embodiments, the hedge trimmer 204 is likewise configured with the electric motor located in a hedger head 212 of the hedge trimmer 204.

Figure 3:
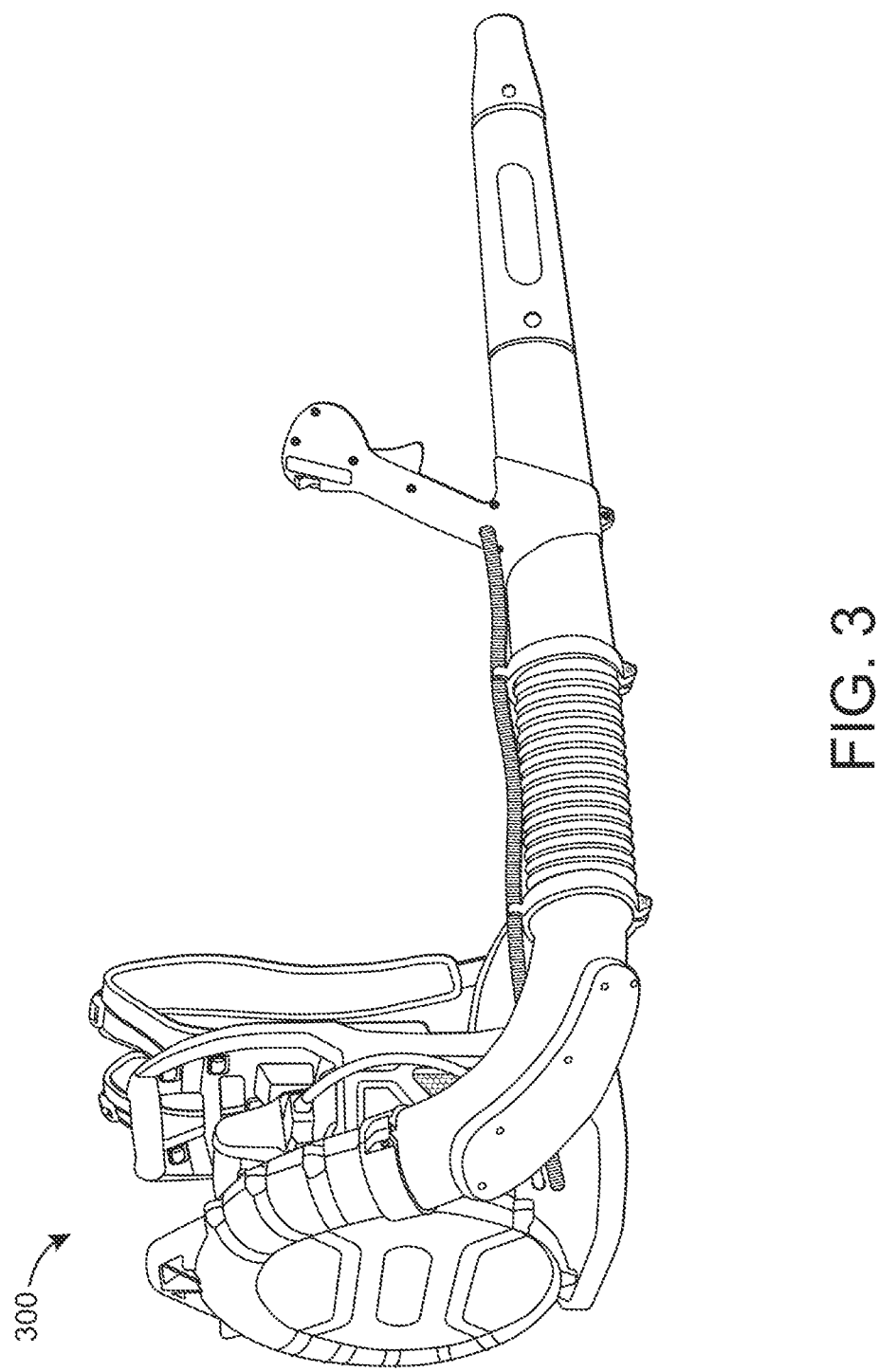
FIG. 3 is an illustration of an electric leaf blower, according to some embodiments.

In another example, in particular a backpack leaf blower 300 such as shown in FIG. 3, the tool noise profile can be further limited by various structural arrangements, such as using an inward-facing fan intake. The backpack leaf blower 300 is an example implementation of the tool 100, according to some embodiments. In some embodiments, the backpack leaf blower 300 includes an inward facing positioning of a fan intake, which prevents noise generated by the fan blades of the backpack leaf blower 300 from escaping into the environment. In some embodiments, the backpack leaf blower 300 additionally or alternatively includes a downward facing air intake, which minimizes fan noise emissions both to the user and to bystanders (as noise is directed into the ground). In some embodiments, the fan diameter and geometry are optimized to reduce noise. For example, at a relatively low 5800 RPM fan speed, noise mitigation has found optimal a 260 to 300 mm fan outer diameter, such as 270 mm, such that the backpack leaf blower 300 can include a fan having a 260 to 300 mm fan outer diameter, such as 270 mm. Fan noise increases roughly equal to the square of the fan blade tip velocity. Using a relatively low speed motor, as for embodiments of the tool 100, can reduce or avoid noise that would otherwise be required in mechanical reduction of higher motor speed (e.g., through gearing, etc.), thereby reducing noise and improving noise tonality.

Figure 4:
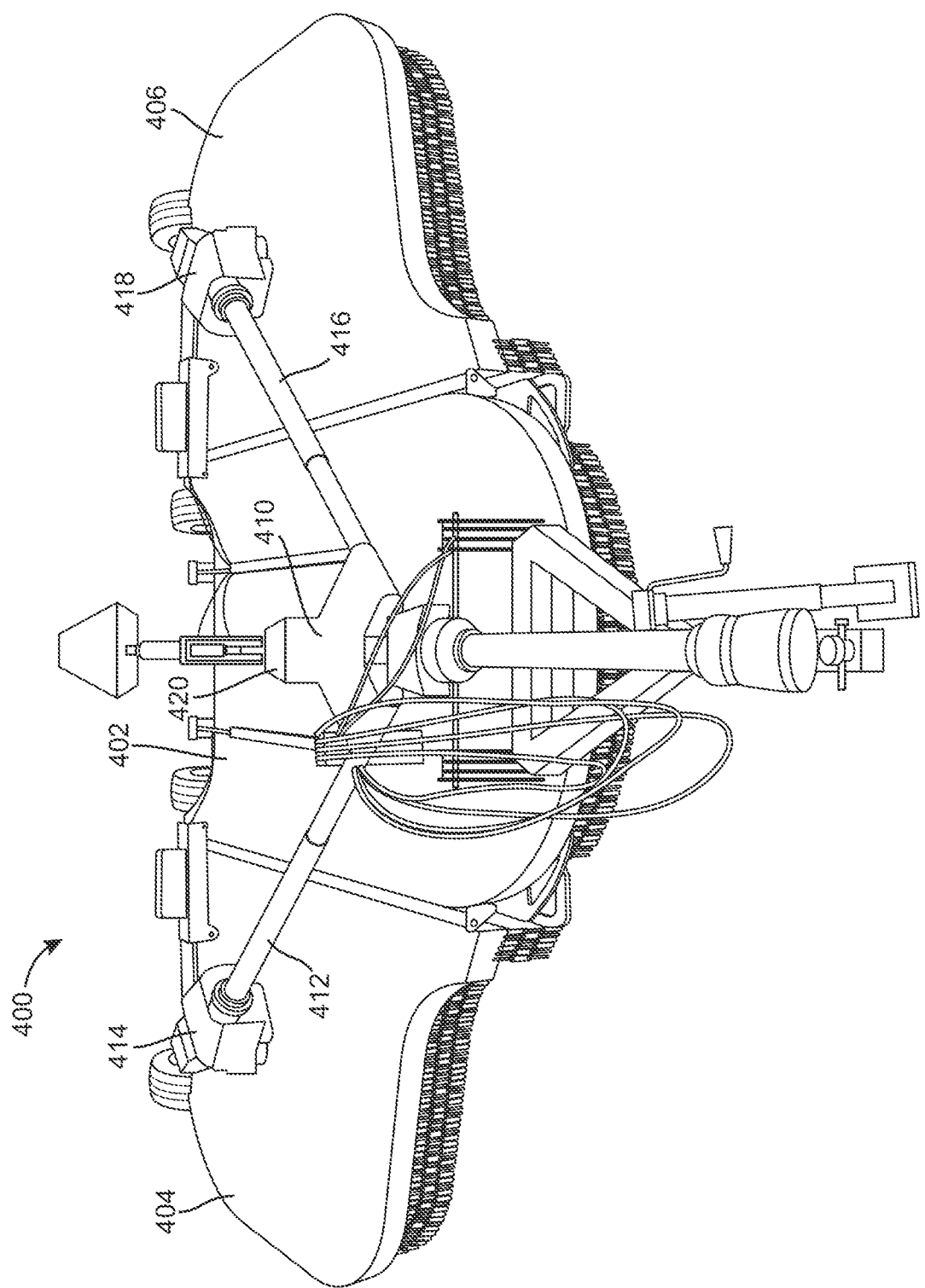
FIG. 4 is an illustration of a rotary cutter, according to some embodiments.
Figure 5:
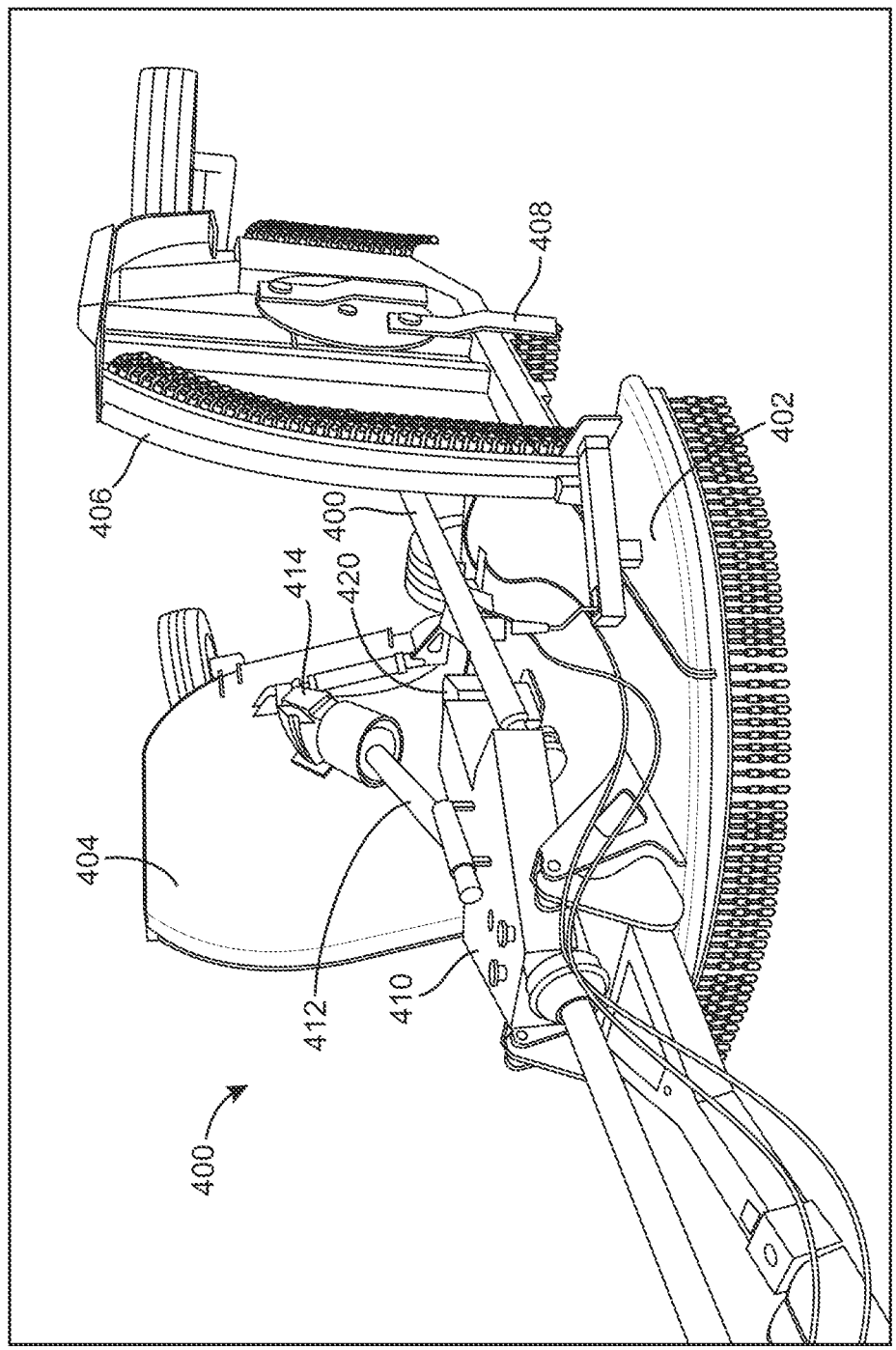
FIG. 5 is another illustration of a rotary cutter, according to some embodiments.

Referring now to FIGS. 4-5, a rotary cutter 400 is shown, according to some embodiments. The rotary cutter 400 is shown as a multi-spindle rotary cutter having a center portion 402, a first wing 404 coupled to the center portion 402, and a second wing 406 coupled to the center portion 402 such that the center portion 402 is between the first wing 404 and the second wing 406. The first wing 404 and the second wing 406 are rotatable relative to the center portion 402 such that the first wing 404 and the second wing 406 can rotated between deployed positions parallel with the center portion 402 (as shown in FIG. 4) and out-of-use positions at an angle (e.g., greater than 45 degrees, greater than 70 degrees) relative to the center portion 402 (as shown in FIG. 5). Each of the center portion 402, the first wing 404, and the second wing 406 has one or more blades on an underside thereof, as shown for blade 408 of the second wing 406 visible in FIG. 5. In some embodiments, the rotary cutter 400 is moved by a tractor (e.g., towed by the tractor) for use in cutting grass, brush, or other plant matter.

In some embodiments, one or more electrical motors 106 are provided with the rotary cutter 400 for use in powering rotation of the one or more blades for one or more of the first wing 404, the second wing 406, and the center portion 402. For example, in some embodiments, an electric motor 106 is coupled to the center portion 402 and positioned at a hub 410. In such an embodiment, a first shaft 412 can act as an embodiment of drive train 107 to transfer mechanical power from the electric motor 106 to a gear box 414 coupled to and positioned on the first wing 404 and a second shaft 416 can act as an embodiment of drive train 107 to transfer mechanical power from the electric motor 106 to a gear box 418 coupled to and positioned on the second wing 406. A power supply (e.g., power supply 102) and/or a controller (e.g., controller 104) can also be provided as elements of the rotary cutter 400 (e.g., positioned at the hub 410) in various embodiments.

In some embodiments, each of the first wing 404, the second wing 406, and the center portion 402 has an instance of electric motor 106 coupled thereto and positioned thereon. In some such embodiments, the first gear box 414 includes an electric motor, the second gear box 418 includes an electric motor, and a gear box 420 for the center portion 402 includes an electric motor. In some such embodiments, the electric motors can be controlled independently, thereby independently affecting rotation of blades of the first wing 404, the second wing 406, and the center portion 402 and noise produced at the first wing 404, the second wing 406, and the center portion 402. For example, the electric motors of different sections (first wing 404, the second wing 406, the center portion 402) can be turned on and off independently to contribute to noise reduction, to cut only desired areas, or as for other reasons that certain sections would be desirable to operate without operation of other sections. One or more power supplies (e.g., power supplies 102) and/or controllers (e.g., controller 104) can also be provided as elements of the rotary cutter 400 (e.g., positioned at each of the gear boxes 414, 418, 420) in various embodiments.

In such embodiments, different electric motors are operable to actuate different end effectors (blades) of the rotary cutter 400. In some such embodiments, one or more controllers 104 included with the rotary cutter 400 to control the electric motors can manage acoustic sound created by the rotary cutter by independently adjusting the power or speed of each electric motor based on relative loads on the different electric motors. For example, in a situation, the first wing 404 may be passing across/through relatively-tough or wet plant matter while the second wing 406 is positioned above pavement, gravel, already-cut plant matter, etc., such that a load on an electric motor for the first wing 404 is higher than a load on an electric motor for the second wing 406. In such a scenario and in some embodiments, one or more controllers 104 controlling separate motors of the first wing 404 and the second wing 406 are programmed to increase power provided to the motor (or operating frequency of the motor) of the first wing 404 and decrease power (or operating frequency) of the motor of the second wing (e.g., such that sound production of the second wing is reduced) based on the relative loads on the different motors. The relative loads determined based on current drawn by each motor 106 as can be determined by a controller 104). In some such embodiments, such adjustments are made subject to a constraint on total overall power and/or total sound production.

Still referring to FIG. 4, the rotary cutter 400 thereby can include one or more instances of the circuitry 101 of FIG. 1, in various embodiments. As such, the one or more electric motors of the rotary cutter 400 can be configured, controlled, and operated as described in detail above, for example for providing a relatively high power at a relatively low RPM, thereby providing a lower noise profile as compared to other implementations, including relative to conventional combustion-engine powered implementations. Other noise-management processes described herein can also be applied for the rotary cutter 400. The teachings herein thereby provide a noise-limited rotary cutter 400, for example emitting sound of less than 75 decibels as experienced by a user at a distance of 50 feet without obstructions between the user and the rotary cutter 400.

While FIGS. 4-5 show the rotary cutter 400 as a multi-spindle rotary cutter, the teachings herein also contemplate a single-spindle rotary cutter, a two-spindle rotary cutter, rotary cutters with greater numbers of wings or spindles (e.g., up to 9 or higher), a lawn mower, a finish mower, or various other types of brush cutters, mowers, lawn care implements, tractor attachments, shredder, seeder, post hole digger, snow blowers, flail shredders, stump grinders, etc. including one or more instances of the circuitry 101 for power one or more end effectors thereof. The teachings herein can be adapted to any such implementation.

Figure 6:
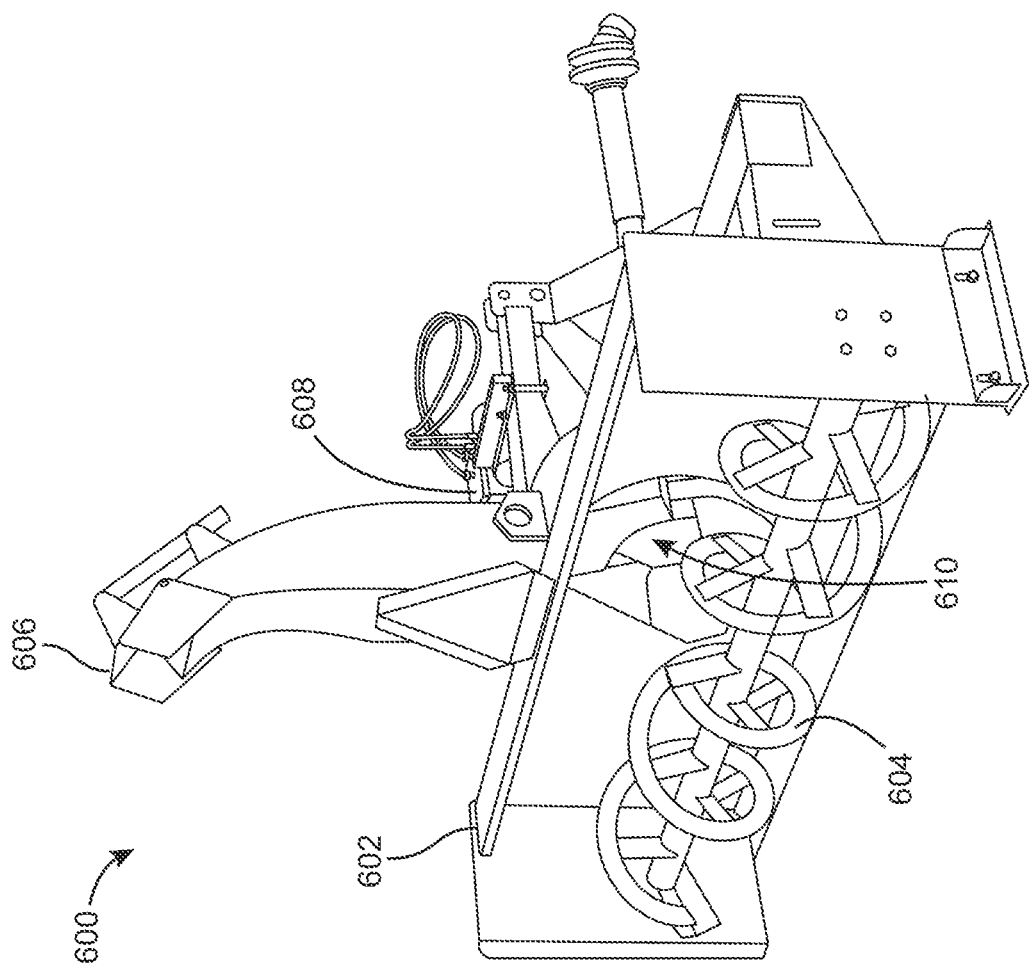
FIG. 6 is an illustration of a snow blower tractor attachment, according to some embodiments.

As one such example, FIG. 6 shows a snow blower attachment 600. The snow blower attachment 600 including a scoop 602, an auger 604 coupled to the scoop 602 and rotatable relative to the scoop 602 about an axis of the auger, and a chute 606 coupled to and extending from the scoop 602, and a fan 610 coupled to the scoop 602 and located between the auger 604 and the chute 606. When operated and pushed through snow, the scoop 602 gather snow to the auger 604, rotation of the auger 604 feeds the snow in the scoop 602 to the fan 610, and the fan 610 rotates to discharge the snow out of the chute 606, thereby clearing snow from a path of the snow blower attachment 600.

In the example of FIG. 6, the snow blower attachment 600 includes the circuitry 101 coupled to the scoop 602 and positioned in a housing 608 coupled to the scoop 602. The electric motor 106 of the circuitry 101 is coupled via a drive train to the auger 604 such that the electric motor 106 drives rotation of the auger 604 and/or to the fan 610 such that the electric motor 106 drives the fan 610. The snow blower attachment 600 is thereby provided with the various noise-reduction features taught herein. The teachings herein can thereby provide, for example, a snow blower attachment 600 operable to move snow while emitting sound of less than 65 as experienced by a user at a distance of 50 feet without obstructions between the user and the snow blower attachment 600. It should be apparent from the disclosure herein that such adaptations can also be implemented for electric tools (including equipment, implements, lawn care devices, agricultural devices, construction devices, etc.) in general, including but not limited to the examples provided herein.

Figure 7:
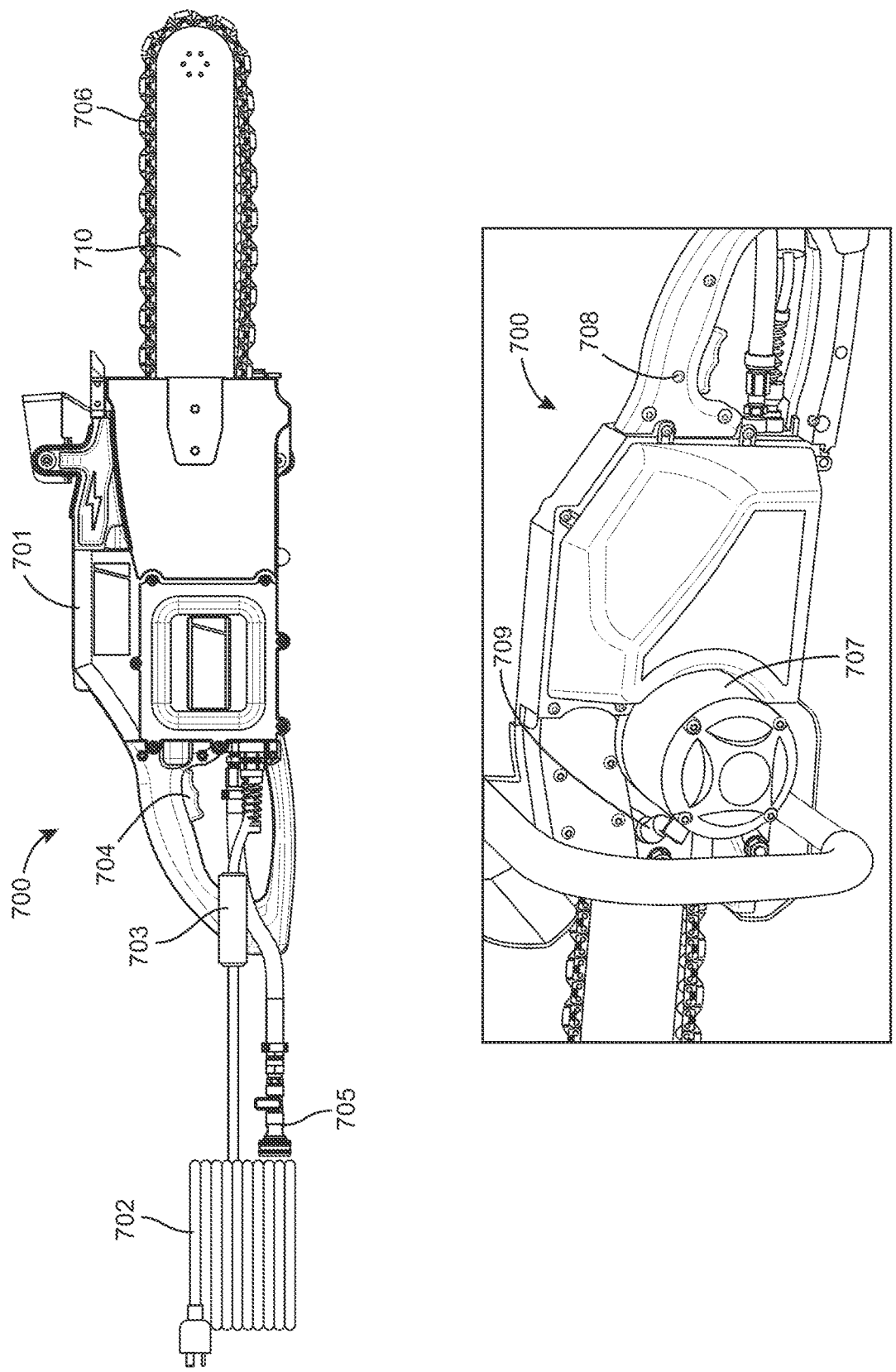
FIG. 7 is an illustration of a power cutter, according to some embodiments.

As another example of an electric tool 100, FIG. 7 shows two views of a power cutter 700. The power cutter 700 includes a body 701, a power cord 702 coupled to the body 701 and including a splice point 703 that enables cord replacement, a trigger 704 coupled to the body 701 and configured to be manipulated by a user to affect operation of the power cutter 700 (e.g., configured to cause the power cutter 700 to operate when depressed), and a hose 705 coupled to the body 701 and configured to attach to a water source and to provide water from the water source to the body 701 for cooling of the power cutter 700. The power cutter 700 also includes a bar 710 coupled to the body 701 and cutting chain 706 positioned around the bar 710, and a motor 707 configured to cause drive the cutting chain 706 along the bar 710. The power cutter 700 is also shown as including a pin 708 configured to be moved into a position where the pin 708 prevents depression of the trigger 704 and moved out of said position to allow depression of the trigger 704. The power cutter 700 is also shown as including a hose fitting 709 configured to route water to the bar 710 for cooling and cut lubrication. The cutting chain 706 is an example implementation of the end effector 108 and the motor 707 can be configured as described for the electric motor 106 above and/or as a permanent magnet motor providing approximately 3.6 kW of output power. The power cutter 700 can also include controller 104, with the power cord 702 providing or connecting to a power supply 102. In some embodiments, the power cutter 700 includes a battery pack as a power supply 102.

Figure 8:
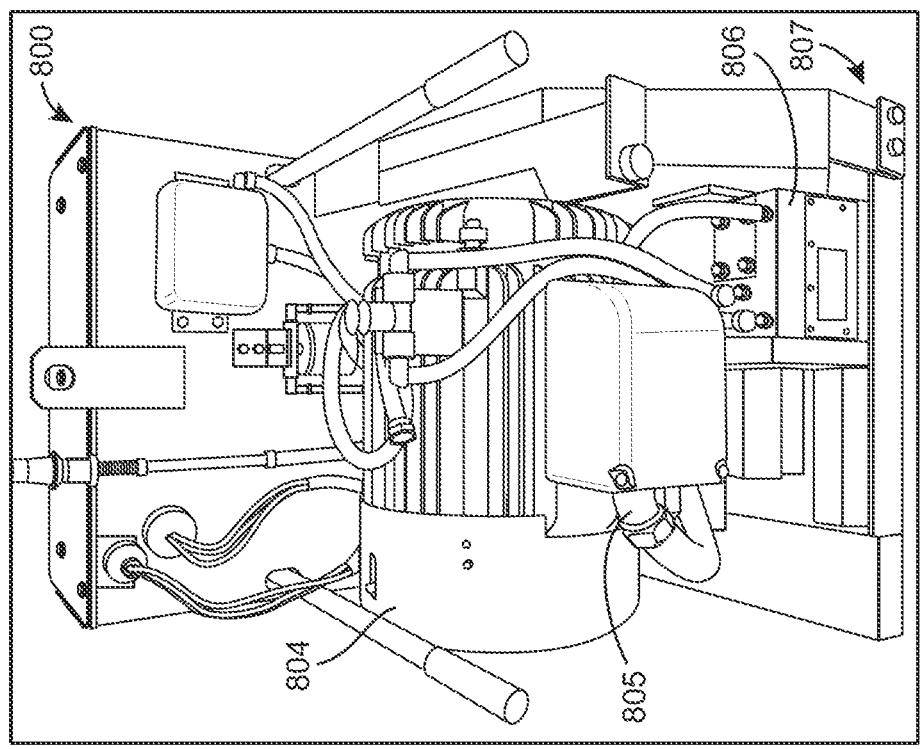
FIG. 8 is an illustration of a flat saw, according to some embodiments.
Figure 8:
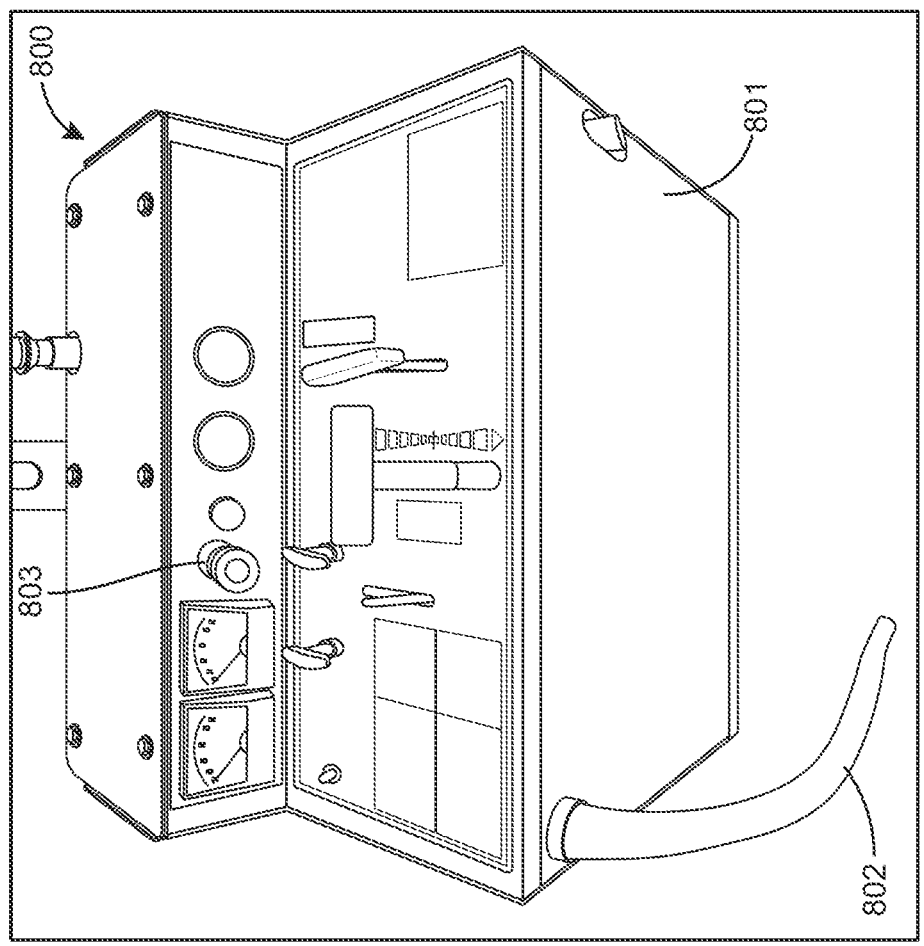

As yet another example of an electric tool 100, FIG. 8 shows two views of a flat saw 800. The flat saw 800 a body 801, a power cord 802 (e.g., connectable to a power supply 102) coupled to the body 801, a pull-to-start button 803 coupled to the body 801 and configured to turn the flat saw 800 on and off (e.g., on when the button 803 is pulled out, off when the button 803 is pushed in), an electric motor 804 coupled to the body 801 and configured to be turned on and off by the pull-to-start button 803, an electrical input cable 805 coupled to the electric motor 804 and provide electricity (e.g., three phase electric power) to the electric motor 804, and a gear box 806 configured to transfer kinetic power from the electric motor 804 to a blade 807 of the flat saw 800. The blade 807 is an example of the end effector 108 and the motor 804 is an example of the motor 106 described above, with the gear box 806 being an implementation of drive train 107. The flat saw 800 can include the controller 104 described above. Accordingly, the flat saw 800 can be configured according to the various teachings described herein.

In some embodiments, the controller 104 is configured to determine a resonant frequency of the tool 100 and set an operating frequency of the end effector 108 to be different than the resonant frequency of the tool 100, for example by controlling an RPM of the electric motor 106. For example, where the tool 100 is a stick tool (e.g., string trimmer 200, edger 202, hedge trimmer 204 as shown in FIG. 2 and described with reference thereto), the controller 104 is programmed to determine a resonant frequency of a shaft of the string trimmer 200, edger 202, or hedge trimmer 204 (as appropriate for a given embodiment) and can control the electric motor 106 to cause rotation or reciprocation of the end effector 108 (e.g., trimmer head 206, blade 210) at an operating frequency different than the resonant frequency.

In examples where the tool 100 is a rotary cutter (e.g., rotary cutter 400), the resonant frequency can be a resonant frequency of the center portion 402, the first wing 404, or the second wing 406, for example determined using sensor measurements (e.g., vibration sensor, accelerometer) and/or from manufacturer specifications. In such embodiments, the controller 104 is programmed to control the electric motor 106 to cause rotation of blades of the rotary cutter 400 at a frequency other than the resonant frequency of the rotary cutter. Such teachings can be extended to the other tractor attachments, implements, tools, etc. described herein (e.g., control of a fan at a frequency other than a resonant frequency of a scoop of a snow blower) such that operation is at resonant frequencies other than designed or measured resonant frequencies of mechanical components of such attachments, implements, tools, etc. The difference in frequencies can avoid sound (and undesirable vibrations) that might otherwise be generated by alignment of operating frequency and resonant frequency.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method, comprising:
providing an electric implement configured to move or cut material in an outdoor environment, wherein operating the electric implement creates acoustic sound; and
managing the acoustic sound by:
selecting an operating frequency for the electric implement by setting the operating frequency to be different than a resonant frequency
of the electric implement; and
controlling an electric motor of the electric implement in accordance with the operating frequency.

2. The method of claim 1, wherein the operating frequency is a carrier frequency of pulse-width modulation of the electric motor, and wherein selecting the operating frequency comprises setting the operating frequency to a value of at least 7 kHz.

3. The method of claim 2, wherein the operating frequency is approximately 10 KHz.

4. The method of claim 1, wherein operating the electric implement comprises rotating or reciprocating, by the electric motor, an end effector of the electric implement at the operating frequency.

5. The method of claim 1, wherein operating the electric implement comprises moving the electric implement with a tractor.

6. The method of claim 1, further comprising:
receiving a user input to the electric implement; and
changing, in response to the user input, the acoustic sound created by operating the electric motor in response to the user input.

7. The method of claim 6, wherein changing, in response to the user input, the acoustic sound comprises altering the operating frequency of the electric implement.

8. The method of claim 1, wherein managing the acoustic sound further comprises dynamically adjusting the operating frequency as a function of load on the electric motor.

9. The method of claim 1, wherein:
operating the electric implement comprises:
controlling the electric motor to actuate a first end effector of the electric implement; and
controlling an additional electric motor to actuate a second end effector of the electric implement; and
managing the acoustic sound further comprises adjusting power or speed of the electric motor relative to the additional electric motor based on relative loads on the electric motor and the additional electric motor.

10. An electric implement comprising:
an electric motor;
an end effector coupled to the electric motor such that the electric motor is operable to move the end effector to cause moving or cutting of soil, plant matter, or other materials by the end effector; and
circuitry powering the electric motor, wherein the circuitry is configured to manage sound created by operation of the electric implement by providing a selected operating frequency of the electric implement.

11. The electric implement of claim 10, wherein the end effector comprises a blade and the electric implement is a rotary cutter.

12. The electric implement of claim 10, comprising a hitch configured to couple the electric implement to a tractor such that the tractor can pull the electric implement.

13. The electric implement of claim 10, wherein the end effector is a chain and the electric implement is a chain saw or power cutter.

14. The electric implement of claim 10, wherein the end effector is a saw blade and the electric implement is a flat saw.

15. The electric implement of claim 10, wherein:
the end effector comprises a fan and the electric implement is a blower; or
the end effector comprises a trimmer head and the electric implement is a string trimmer.

16. The electric implement of claim 10, wherein the selected operating frequency is a carrier frequency of pulse-width modulation of the electric motor of at least 7 kHz.

17. The electric implement of claim 10, wherein the selected operating frequency is a carrier frequency of pulse-width modulation of the electric motor of 10 KHz.

18. The electric implement of claim 10, further comprising a battery pack configured to provide greater than 100 volts direct current to the electric motor.

19. An apparatus adapted for cooperation with a tractor, comprising:
- an electric implement configured to be coupled to the tractor, wherein the electric implement comprises:
  - an electric motor;
  - an end effector coupled to the electric motor such that the electric motor is operable to move the end effector to cause moving or cutting of soil or plant matter by the end effector; and
- circuitry powering the electric motor, wherein the circuitry is configured to manage sound created by operation of the electric implement by providing a selected operating frequency of the electric implement.

20. The apparatus of claim 19, wherein the electric implement further comprises a power source configured to provide greater than 100 volts direct current to the electric motor.

21. The apparatus of claim 19, wherein the selected operating frequency is a carrier frequency of pulse-width modulation of the electric motor of at least 7 kHz.

* * * * *